United States Patent
Itogawa

(10) Patent No.: US 10,044,793 B2
(45) Date of Patent: Aug. 7, 2018

(54) STORAGE MEDIUM STORING INSTRUCTIONS FOR INFORMATION PROCESSING APPARATUS, INFORMATION PROCESSING APPARATUS, AND COMMUNICATION SYSTEM

(71) Applicant: Brother Kogyo Kabushiki Kaisha, Nagoya-shi, Aichi-ken (JP)

(72) Inventor: Yoshihiro Itogawa, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 182 days.

(21) Appl. No.: 14/555,788

(22) Filed: Nov. 28, 2014

(65) Prior Publication Data

US 2015/0154157 A1    Jun. 4, 2015

(30) Foreign Application Priority Data

Nov. 29, 2013  (JP) ................. 2013-247480

(51) Int. Cl.
*G06F 17/00* (2006.01)
*H04L 29/08* (2006.01)
(Continued)

(52) U.S. Cl.
CPC ........ *H04L 67/10* (2013.01); *G06F 17/30879* (2013.01); *G06F 17/2235* (2013.01)

(58) Field of Classification Search
CPC ........... G06F 17/2235; G06F 17/30876; G06F 17/30879; H04L 67/10
(Continued)

(56) References Cited

U.S. PATENT DOCUMENTS 6,732,090 B2 *  5/2004  Shanahan ......... G06F 17/30011
7,191,236 B2 *  3/2007  Simpson-Young . H04L 12/2805
                                                             370/238
(Continued)

FOREIGN PATENT DOCUMENTS

JP   H10-171727    6/1998
JP   2000-148340   5/2000
(Continued)

OTHER PUBLICATIONS

Falas et al., Two-Dimensional Bar-code Decoding with Camera-Equipped Mobile Phones, IEEE 2007, pp. 1-4.*

(Continued)

*Primary Examiner* — Cong-Lac Huynh
(74) *Attorney, Agent, or Firm* — Scully, Scott, Murphy & Presser, PC

(57) ABSTRACT

A non-transitory computer-readable storage medium stores computer-executable instructions. When the instructions are executed by a processor, the instructions cause an information processing apparatus including a communication section configured to communicate with external devices including a server machine on a network, to perform: a process of acquiring hyperlink information corresponding to a hyperlink from document data; a process of acquiring contents specified by the hyperlink information; a process of transmitting the contents to the server machine via the communication section; a process of acquiring, from the server machine, one of URL for acquiring the contents transmitted and URL-related information related to the URL, via the communication section; and a process of generating combined document data in which the URL is combined with the document data.

14 Claims, 11 Drawing Sheets

(51) Int. Cl.
*G06F 17/30* (2006.01)
*G06F 17/22* (2006.01)

(58) Field of Classification Search
USPC .......................................... 715/208, 205–207
See application file for complete search history.

(56) References Cited

U.S. PATENT DOCUMENTS

| | | | | |
|---|---|---|---|---|
| 7,373,588 | B2* | 5/2008 | Carro | G06F 3/04886 |
| | | | | 715/203 |
| 7,788,318 | B2* | 8/2010 | Kinoshita | H04N 1/00127 |
| | | | | 358/1.15 |
| 7,917,523 | B2* | 3/2011 | Dixit | G06F 17/30887 |
| | | | | 707/693 |
| 9,038,897 | B2* | 5/2015 | Jayaprakash | G06F 17/30879 |
| | | | | 235/383 |
| 9,143,839 | B2* | 9/2015 | Reisman | G06F 17/30873 |
| 2003/0159065 | A1* | 8/2003 | Nakagawa | G06F 21/105 |
| | | | | 713/176 |
| 2004/0167895 | A1* | 8/2004 | Carro | G06F 3/04886 |
| 2006/0106623 | A1* | 5/2006 | Lebaschi | G06Q 30/0241 |
| | | | | 705/26.1 |
| 2007/0019222 | A1 | 1/2007 | Oda et al. | |
| 2007/0192279 | A1* | 8/2007 | Van Luchene | G06Q 10/087 |
| 2008/0005651 | A1* | 1/2008 | Grefenstette | G06F 17/3061 |
| | | | | 715/234 |
| 2009/0089859 | A1* | 4/2009 | Cook | H04L 12/585 |
| | | | | 726/3 |
| 2010/0153440 | A1* | 6/2010 | Hubert | G06F 17/30011 |
| | | | | 707/769 |
| 2011/0137641 | A1* | 6/2011 | Kawai | G06F 17/2705 |
| | | | | 704/9 |
| 2012/0248182 | A1* | 10/2012 | Partridge | G06F 3/1204 |
| | | | | 235/375 |
| 2013/0124964 | A1* | 5/2013 | Viegas | G06F 17/278 |
| | | | | 715/230 |
| 2013/0279300 | A1* | 10/2013 | Iwase | H04N 21/237 |
| | | | | 367/197 |
| 2014/0299662 | A1* | 10/2014 | Harrison | G06F 17/30879 |
| | | | | 235/380 |
| 2014/0361075 | A1* | 12/2014 | Boncyk | G06F 17/30259 |
| | | | | 235/379 |
| 2015/0008256 | A1* | 1/2015 | Beadles | G06F 17/30879 |
| | | | | 235/375 |
| 2015/0113478 | A1* | 4/2015 | Nakayama | G06Q 40/12 |
| | | | | 715/811 |
| 2015/0143135 | A1* | 5/2015 | Ueda | G06F 21/10 |
| | | | | 713/193 |
| 2015/0234929 | A1* | 8/2015 | Goyal | G06F 17/30879 |
| | | | | 235/375 |
| 2015/0242096 | A1* | 8/2015 | Carro | G09B 21/001 |
| | | | | 715/277 |
| 2015/0288716 | A1* | 10/2015 | Emigh | H04L 63/1441 |
| | | | | 726/22 |
| 2015/0350309 | A1* | 12/2015 | Wildern, IV | H04N 21/258 |
| | | | | 709/219 |
| 2016/0087990 | A1* | 3/2016 | Cepuran | H04L 63/0245 |
| | | | | 726/3 |
| 2016/0132925 | A1* | 5/2016 | Durst, Jr. | G06Q 30/0255 |
| | | | | 705/14.53 |
| 2017/0188240 | A1* | 6/2017 | Giordano | H04L 63/08 |
| 2018/0075155 | A1* | 3/2018 | Lee | G06F 17/30879 |

FOREIGN PATENT DOCUMENTS

| | | |
|---|---|---|
| JP | 2006-11777 A | 1/2006 |
| JP | 2007-026353 | 2/2007 |
| JP | 2007-172448 A | 7/2007 |

OTHER PUBLICATIONS

Huang et al., Reversible Data Hiding with Histogram-based Difference Expansion for QR Code Applications, IEEE 2011, pp. 779-787.*

Kise et al., Background as Information Carriers for Printed Documents, IEEE 2000, pp. 380-384.*

Gupta et al., Sizzle: A Standard-based End-to-End Security Architecture for the Embedded Internet, Elsevier 2005, pp. 425-445.*

Xiong et al., Towards End-to-End Secure Content Storage and Delivery with Public Cloud, ACM 2012, pp. 257-266.*

Notice of Reasons for Rejection dated Sep. 19, 2017 issued in Application No. 2013-247480.

* cited by examiner

STORAGE MEDIUM STORING INSTRUCTIONS FOR INFORMATION PROCESSING APPARATUS, INFORMATION PROCESSING APPARATUS, AND COMMUNICATION SYSTEM

CROSS REFERENCE TO RELATED APPLICATION

The present application claims priority from Japanese Patent Application No. 2013-247480 filed on Nov. 29, 2013 the disclosure of which is incorporated herein by reference in its entirety.

BACKGROUND

Field of the Invention

The present invention relates to an information processing apparatus which is communicable with external devices on a network, a storage medium storing instructions for the information processing apparatus, and a communication system which includes the information processing apparatus and a server machine.

Description of the Related Art

By displaying an image based on document data in which a hyperlink has been embedded on a panel of a PC (personal computer) etc. and by clicking a location at which the hyperlink has been embedded with a mouse etc., it is possible to make an access to a linked device, and to acquire data from that linked device. However, in a case that a document based on the document data in which the hyperlink has been embedded is printed and the document is distributed, there is a possibility that a person to whom the document has been distributed is not capable of acquiring data from the linked device.

For instance, in a case that the hyperlink has been set in a URL (abbreviation for Uniform Resource Locator), the URL is printed on the document. Therefore, the person to whom the document has been distributed is able to make an access to the linked device by using the URL that has been printed, and to acquire data from the linked device. Whereas, in a case that the hyperlink has been set in a symbol or an icon other than the URL, the URL is not printed on the document, and the symbol or the icon other than the URL is printed on the document. Therefore, the person to whom the document has been distributed is not able to make an access to the linked device, and cannot acquire data from the linked device.

In view of such circumstances, in information processing apparatuses described in Japanese Patent Application Laid-open Nos. 2000-148340 and H10-171727, hyperlink information that has been set in a hyperlink is converted to a two-dimensional code such as a QR (quick response) Code® (registered trademark of DENSO WAVE), and the two-dimensional code is printed on a document. Accordingly, a person to whom the document has been distributed can acquire the hyperlink information by picking up an image of the two-dimensional code by a camera of a mobile telephone etc., and can acquire data from a linked device by making an access to the linked device.

SUMMARY OF THE INVENTION

However, in a technology described in Japanese Patent Application Laid-open Nos. 2000-148340 and H10-171727, there have been the following issues. For instance, in a case that a linked device has not been made open to the public on a public network, there is a possibility that data cannot be acquired from that linked device. For instance, in a case that the linked device is a device which provides data stored in the linked device only to a client device which exists in the same LAN (abbreviation for Local Area Network), since devices other than a device in the LAN cannot make an access to the linked device, those devices are not possible to acquire data from the linked device. Moreover, in a case that an access to the linked device is restricted to a specific device by setting a password etc., since devices other than that specific device cannot make an access to the linked device, those devices are not possible to acquire data from the linked device. The present teaching has been made in view of such circumstances.

According to a first aspect of the present teaching, there is provided a non-transitory computer-readable storage medium storing computer-executable instructions that, when executed by a processor, cause an information processing apparatus including a communication section which is configured to communicate with external devices including a server machine on a network, to perform: a hyperlink-information acquiring process of acquiring hyperlink information corresponding to a hyperlink from document data; a contents acquiring process of acquiring contents specified by the hyperlink information; a contents transmission process of transmitting the contents to the server machine by communicating with the server machine via the communication section, in a case that the contents are acquired in the contents acquiring process; a URL-information acquiring process of acquiring, from the server machine, one of URL for acquiring the contents, transmitted by the contents transmission process, from the server machine and URL-related information related to the URL, via the communication section; and a document-data generating process of generating combined document data in which the URL are combined with the document data, in a case that one of the URL and the URL-related information is acquired in the URL-information acquiring process.

According to a second aspect of the present teaching, there is provided an information processing apparatus including: a communication section configured to communicate with external devices including a server machine on a network; and a control section, wherein the control section includes: a hyperlink-information acquiring section configured to acquire hyperlink information corresponding to a hyperlink from document data; a contents acquiring section configured to acquire contents specified by the hyperlink information; a contents transmitting section configured to transmit the contents to the server machine by communicating with the server machine via the communication section, in a case that the contents acquiring section acquires the contents; a URL-information acquiring section configured to acquire, from the server machine, one of URL for acquiring the contents, transmitted by the contents transmitting section, from the server machine and URL-related information related to the URL, via the communication section; and a document-data generating section configured to generate combined document data in which the URL is combined with the document data, in a case that the URL-information acquiring section acquires one of the URL and the URL-related information.

According to a third aspect of the present teaching, there is provided a communication system including: an information processing apparatus; and a server machine, wherein the information processing apparatus includes: an information processing apparatus communication section configured to communicate with external devices on a network; and an information processing apparatus control section, wherein the information processing apparatus control section includes: a hyperlink-information acquiring section configured to acquire hyperlink information corresponding to a hyperlink from document data; a contents acquiring section configured to acquire contents specified by the hyperlink information; a contents transmitting section configured to transmit the contents to the server machine by communicating with the server machine via the information processing apparatus communication section, in a case that the contents acquiring section acquires the contents; a URL-information acquiring section configured to acquire, from the server machine, one of URL for acquiring the contents, transmitted by the contents transmitting section, from the server machine and URL-related information related to the URL, via the information processing apparatus communication section; and a document-data generating section configured to generate combined document data in which the URL is combined with the document data, in a case that the URL-information acquiring section acquires one of the URL or the URL-related information, and wherein the server machine includes: a first device which includes a first device control section and a first device communication section configure to communicate with the external devices on the network and which is open to a public network; and a second device which includes a storage section and a second device control section, which is configured to communicate with the first device, and which is closed with respect to the public network, wherein the first device control section includes a first transmitting section configured to transmit the contents to the second device and then to delete the contents, in a case that the contents are acquired from the information processing apparatus via the first device communication section, wherein the second device control section includes: a storage control section configured to store the contents that are transmitted by the first transmitting section in the storage section, in a state that identification information for identifying the contents is associated with the contents; and a second transmitting section configured to transmit the identification information to the first device, and wherein the first device control section includes a third transmitting section configured to transmit, to the information processing apparatus via the first device communication section, one of the URL and the URL-related information including at least the identification information that is transmitted by the second transmitting section.

In the storage medium, the information processing apparatus, and the communication system according to the present teaching, in a case that the hyperlink information is acquired in the information processing apparatus, the contents specified by the hyperlink information are acquired. The acquired contents are transmitted to the server machine. As the server machine receives the contents, the URL for acquiring the contents from the server machine or the URL-related information related to that URL is transmitted. As the information processing apparatus receives the URL or the URL-related information, the information processing apparatus generates the combined document data by combining the URL with the document data. Accordingly, even in a case that the linked device has not been made open to the public on the public network, the contents of the linked device are stored in the server machine. Therefore, it is possible to acquire the contents from the server machine by using the URL in the combined document data.

Moreover, in the communication system according to the present teaching, the server machine consists of a first device that is open to the public on the public network, and the second device, which is capable of communicating with the first device and which is not open to the public on the public network. As the contents are transmitted to the server machine from the information processing apparatus, the first device receives the contents. Thereafter, the first device transmits the contents to the second device, and deletes the contents after the contents have been transmitted. The second device which has received the contents stores the contents received upon associating with the identification information, and transmits the identification information to the first device. The first device which has received the identification information transmits the URL or the URL-related information which includes at least the identification information, to the information processing apparatus. In such manner, in the server machine, the contents are stored in the second device which is closed to the public network, and the contents acquired are deleted in the first device which is open to the public network. Accordingly, it is possible to secure appropriately the confidentiality of the contents.

DETAILED DESCRIPTION OF THE EMBODIMENTS

<Configuration of Communication System>

Figure 1A:
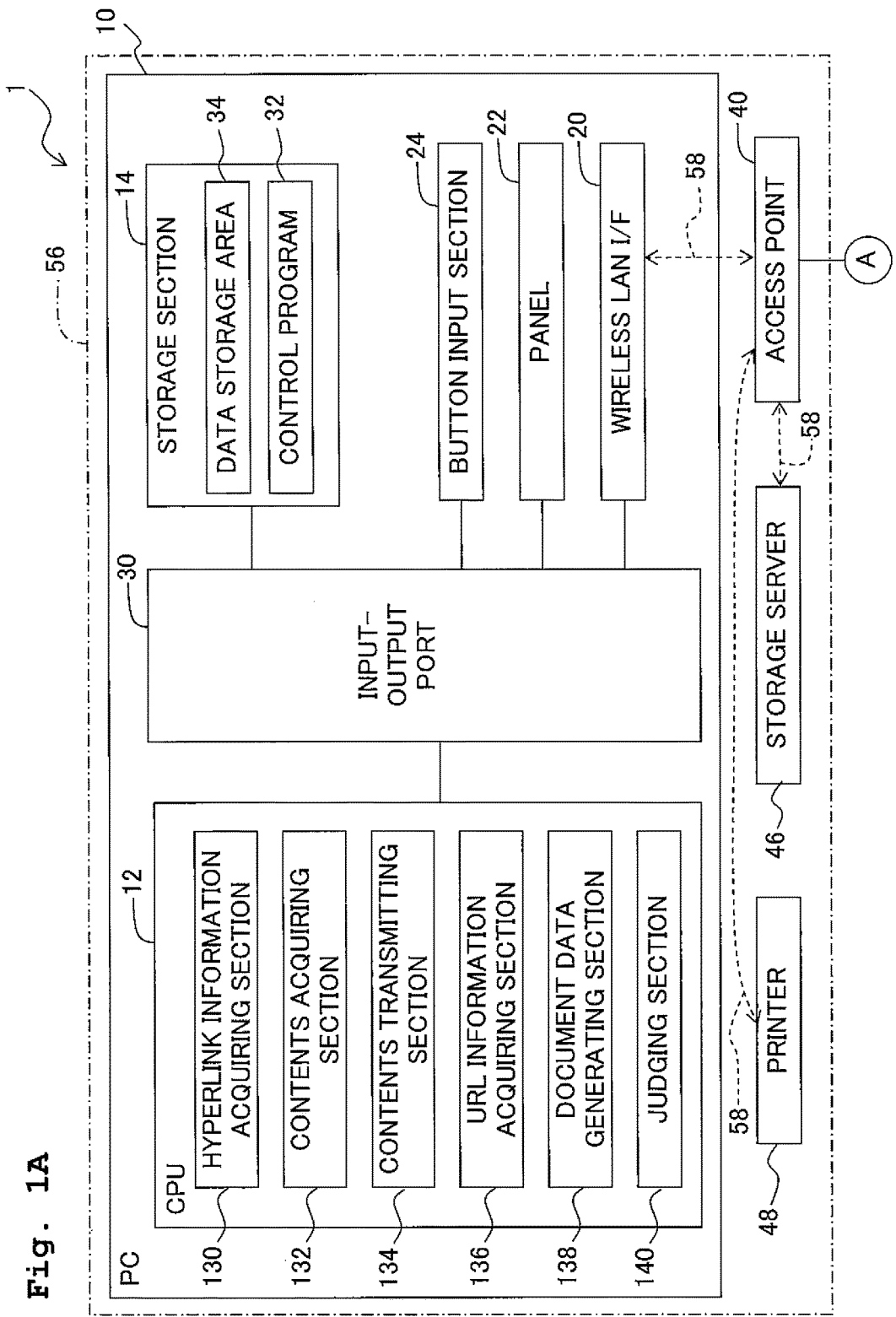
FIGS. 1A and 1B show a block diagram of a communication system.
Figure 1B:
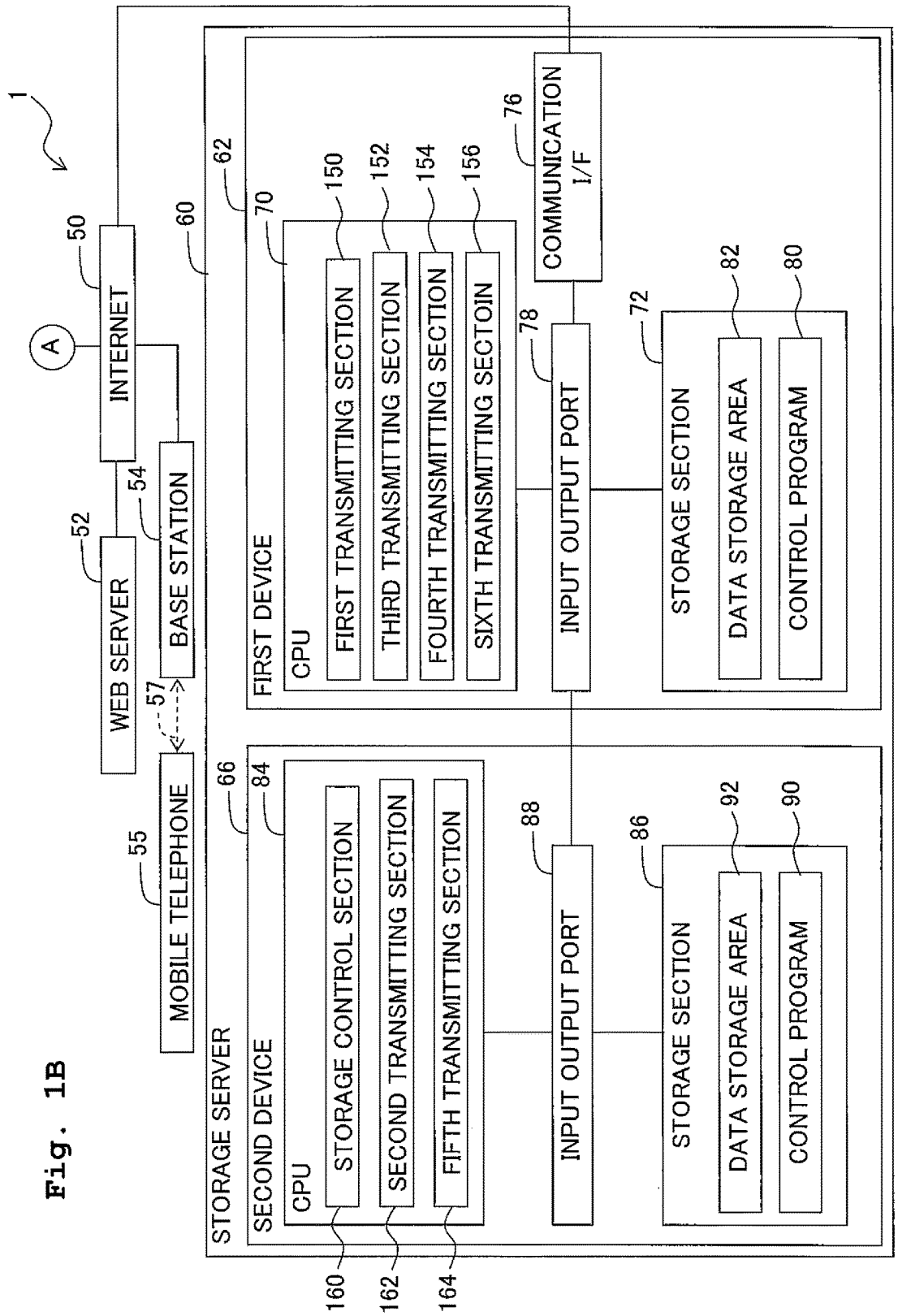

A block diagram of a communication system 1 exemplified as a first embodiment of the present teaching is shown in FIGS. 1A and 1B. The communication system 1 includes a PC (an abbreviation for personal computer) (an example of an information processing apparatus of the present teaching) 10, an access point 40, a storage server 46, a printer 48, the Internet 50, a web server 52, a base station 54, a mobile telephone 55, and a storage server (an example of a server machine of the present teaching) 60.

The PC 10, the storage server 46, and the printer 48 have a function as a known wireless LAN terminal equipment, and are capable of transmitting and receiving data mutually via the access point 40. Devices which transmit and receive data via the access point 40, in other words, the PC 10, the storage server 46, and the printer 48 exist in a same LAN (abbreviation for Local Area Network) 56.

The printer 48 is a device which executes printing based on data transmitted from the PC 10. The storage server 46 is a device which provides data etc. stored therein to a client device existing in the LAN 56. Whereas, the web server 52 is a device which provides data etc. stored therein to a client device in a public network.

A mobile telephone 55 carries out a wireless communication 57 with the base station 54 in accordance with a communication method of mobile-telephone. In other words, as the mobile telephone 55 makes an access to the base station 54, and is in a state of being able to carry out the wireless communication 57 in accordance with the communication method of mobile-telephone, it is possible to carry out data communication with the web server 52 or the storage server 60 via the Internet 50.

A configuration of the PC 10 will be described below. The PC 10 includes mainly, a CPU (an abbreviation for central processing unit) (an example of an information processing apparatus control section, a control section, and a computer of the present teaching) 12, a storage section 14, a wireless LAN I/F (an example of an information processing apparatus communication section and a communication section of the present teaching) 20, a panel 22, a button input section 24. These components are mutually communicable via an input-output port 30.

The wireless LAN I/F 20 is capable of carrying out a wireless communication (data communication using radio waves) 58 in accordance with an infrastructure mode (a mode in which a plurality of wireless LAN terminal equipment perform data communication via an access point) of a wireless LAN method. The wireless communication 58 is a wireless communication of a Wi-Fi® (registered trademark of Wi-Fi Alliance) mode in accordance with IEEE (Institute of Electrical & Electronic Engineers) 802.11 standard, and standards based thereon. Moreover, the storage server 46 and the printer 48 are also capable of carrying out the wireless communication 58. Therefore, as the PC 10 makes an access to the access point 40, and is in a state of being able to carry out the wireless communication 58 of wireless LAN method, it is possible to perform data communication with other device connected to the access point 40, in other words, with the storage server 46 and the printer 48. Furthermore, by the access point 40 being connected to the Internet 50, it is also possible to carry out data communication with devices outside the LAN 58 such as the web server 52 and the storage server 60, via the access point 40.

The CPU 12 executes processing according to a control program (an example of instructions of the present teaching) 32 in the storage section 14. The control program 32 is a computer program for generating print data. The storage section 14 is formed by combining a RAM (an abbreviation for Random Access Memory), a ROM (an abbreviation for Read Only Memory), a flash memory, a HDD (an abbreviation for hard disc drive), a buffer included in the CPU 12, and the like. Moreover, the storage section 14 includes a data storage area 34. The data storage area 34 is an area for storing data such as document data for generating the print data, and data necessary for executing the control program 32.

The button input section 24 includes a keyboard, and receives a button operation by a user. The panel 22 displays characters etc. inputted by the button input section 24.

A configuration of the storage server 60 will be described below. The storage server 60 includes a first device (an example of a first device of the present teaching) 62 and a second device (an example of a second device of the present teaching) 66. The first device 62 mainly includes a CPU (an example of a first device control section of the present teaching) 70, a storage section 72, a communication I/F (an example of a first device communication section of the present teaching) 76. These components are communicable mutually via an input-output port 78.

The CPU 70 executes processing according to a control program 80 in the storage section 72. The control program 80 is a computer program for transmitting and receiving data to and from the second device 66, or for transmitting and receiving data to and from external devices. The storage section 72 includes a RAM, a ROM, a flash memory, a HDD, and a buffer in the CPU 70 etc. being combined. Moreover, the storage section 72 includes a data storage area 82. The data storage area 82 is an area storing data to be transmitted to and received from the second device 66 or the external devices, and data necessary for executing the control program 80.

The communication I/F 76 is connected to the Internet 50. Accordingly, the first device 62 is capable of providing data stored in the data storage area 82 to client devices in the public network.

The second device 66 mainly includes a CPU (an example of a second device control section of the present teaching) 84 and a storage section 86. These components are mutually communicable via an input-output port 88.

The CPU 84 executes processing according to a control program 90 in the storage section 86. The control program 90 is a computer program for transmitting and receiving data to and from the first device 62. The storage section 86 is formed by a RAM, a ROM, a flash memory, a HDD, and a buffer in the CPU 84 etc. being combined. Moreover, the storage section 86 includes a data storage area 92. The data storage area 92 is an area for storing data to be transmitted to and received from the first device 62, and data necessary for executing the control program 90.

The input-output port 88 is connected to the input-output port 78 of the first device 62. Accordingly, the second device 66 is capable of providing data stored in the data storage area 92 only to the first device 62.

<Two-Dimensional Encoding of Hyperlink>

There are cases that a text based on document data in which a hyperlink is embedded is printed on a document, and the document is distributed. In a case that the hyperlink is set in a URL (an abbreviation for Uniform Resource Locator), the URL is printed on such document. Therefore, a person, to whom the document has been distributed, can make an access to a linked device using the URL that has been printed, and it is possible to acquire data from the linked device. However, in a case that the hyperlink has been set in a symbol, an icon, or characters etc. other than the URL, the URL is not printed on the document, and the symbol, the icon, or the characters other than the URL is printed on the document. Therefore, the person to whom the document has been distributed cannot make an access to the linked device, and the person cannot acquire data from the linked device.

Figure 2:
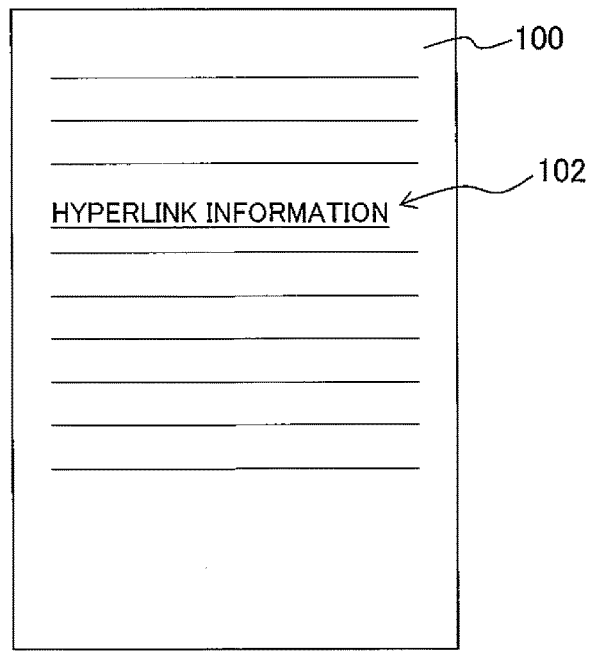
FIG. 2 is a diagram showing a document on which a text based on a document data, in which a hyperlink has been embedded, is printed.

For example, in the PC 10, when document data in which the hyperlink has been embedded is converted to data for print and the data for print is transmitted to the printer 48 via the wireless LAN I/F 20, the printer 48 prints a document 100 shown in FIG. 2. The hyperlink that has been embedded in the document data is set in predetermined characters other than the URL, and the predetermined characters 102 are printed on the document 100. Since a person to whom such a document has been distributed cannot identify the URL by the characters other than the URL, the person cannot make an access to the linked device.

Figure 3:
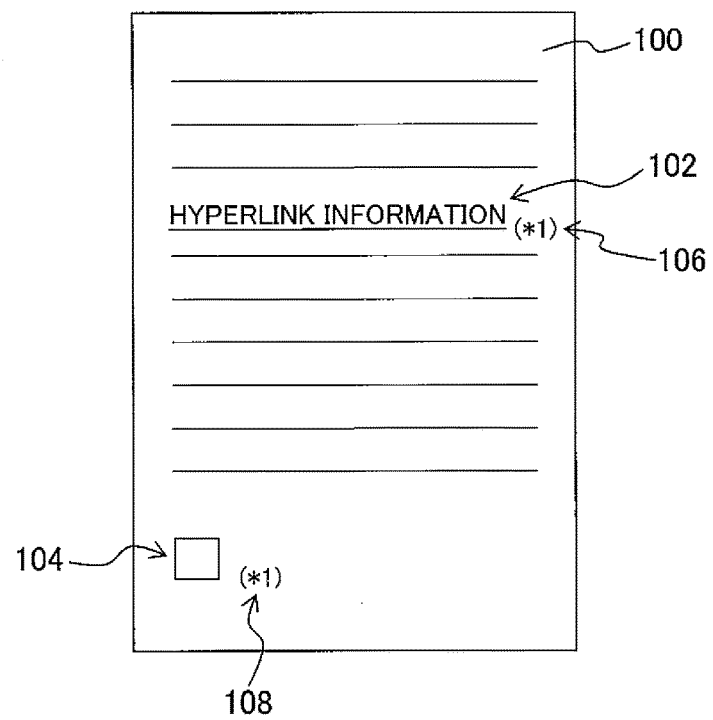
FIG. 3 is a diagram showing a document on which a text based on a document data, with which two-dimensional encoded URL has been combined, is printed.

Therefore, hyperlink information in which the hyperlink has been set, is converted to a two-dimensional code such as a QR Code® (registered trademark of DENSO WAVE), and the two-dimensional code is printed on the document. The hyperlink information is subjected to two-dimensional encoding, and the two-dimensional encoded information is combined with the document data. Therefore, if the document data in which the two-dimensional encoded information has been combined is printed, a two-dimensional code 104 is printed on the document 100 as shown in FIG. 3. The person to whom such a document has been distributed is able to acquire the hyperlink information by picking up an image of the two-dimensional code 104 by a camera of the mobile telephone 55 etc. Moreover, by making an access to the linked device based on the acquired hyperlink information, the person is possible to acquire data from the linked device.

A specific symbol 106 has been recorded next to the predetermined characters 102, and a symbol 108 same as the symbol 106 has been recorded next to the two-dimensional code 104. Accordingly, even in a case that a plurality of two-dimensional codes is printed on the document 100 with respect to a plurality of hyperlinks for instance, a person to whom the document has been distributed is able to use the two-dimensional code 104 corresponding to the predetermined characters 102.

<Change of Hyperlink Information>

However, in a case that the linked device is not open to the public network, there is a possibility that data cannot be acquired from the linked device. Let us assume a case in which the linked device is the storage server 46 for example. The storage server 46 is a device that provides data etc. stored therein to client devices that exist in the same LAN 56. Therefore, in a case that the PC 10 has made an access to the storage server 46, it is possible to acquire data from the storage server 46. However, since the mobile telephone 55 is not capable of making an access to the storage server 46, it is not possible to acquire data from the storage server 46.

Moreover, there are cases in which the access to the linked device is restricted by setting a password etc. In such cases, since it is not possible to make an access to the linked device unless a correct password is transmitted, it is not possible to acquire data from the linked device. In view of such circumstances, in the PC 10, in the case that the linked device is not open to the public network, data stored in the linked device is to be shifted to a device that is open to the public network, and hyperlink information that has been embedded in document data is to be changed to hyperlink information of the shifted device to which the data stored in the linked device has been shifted.

More elaborately, first of all, the PC 10 acquires the hyperlink information from the document data in which the hyperlink has been embedded. Moreover, based on the hyperlink information acquired, the PC 10 makes a judgment of whether or not the linked device is a device that is open to the public network. Concretely, the PC 10 extracts a URL of the linked device from the hyperlink information, and makes a judgment of whether a scheme of the extracted URL is a predetermined scheme ("http" and "ftp" in the present embodiment). In a case that the scheme of the extracted URL is the predetermined scheme, the PC 10 makes a judgment that the linked device is a device that is open to the public network, and in a case that the scheme of the extracted URL is not the predetermined scheme, the PC 10 makes a judgment that the linked device is not a device that is open to the public network.

In a case that the PC 10 has made a judgment that the linked device is not a device that is open to the public network, the PC 10 makes an access to the linked device by using the extracted URL and downloads predetermined contents from that linked device. In a case that the linked device is the storage server 46 for example, the PC 10 makes an access to the storage server 46 via the wireless LAN I/F 20, and downloads contents from the storage server 46. Next, the PC 10 makes an access to a device such as the storage server 60 that is open to the public network, and transmits the contents to the storage server 60. Information for specifying the storage server 60, in other words, a URL for making an access to the storage server 60 is stored in the data storage area 34 of the PC 10.

Since the storage server 60, as aforementioned, includes the first device 62 that is open to the public network and the second device 66 that is not open to the public network, the contents transmitted to the storage server 60 are transmitted to the first device 62, and are temporarily stored in the data storage area 82 of the first device 62. Moreover, the contents stored in the data storage area 82 are transmitted to the second device 66 via the input-output port 78. As the contents are transmitted to the second device 66, the contents stored in the data storage area 82 of the first device 62 are deleted.

Next, as the second device 66 acquires the contents, the second device 66 generates an identification code (an example of identification information of the present teaching) for identifying the contents acquired, and upon associating the identification code with the contents, stores the identification code and the contents in the data storage area 92 of the second device 66. Thereafter, the second device 66 transmits data for specifying the identification code (hereinafter, also referred to as identification-code specifying data) (an example of URL-related information) to the first device 62 via the input-output port 88. The second device 66 stores a time at which the identification code and the contents were stored as an uploading time.

As the first device 62 receives the identification-code specifying data, the first device 62 transmits the identification-code specifying data to the PC 10 via the communication I/F 76. As the PC 10 receives the identification-code specifying data, the PC 10 generates a URL for acquiring contents (hereinafter, also referred to as data acquiring URL) from the storage server 60 based on the identification-code specifying data. Concretely, the data acquiring URL is generated by combining the identification-code specifying information with the URL for making an access to the storage server 60. For instance, in a case that the URL for making an access to the storage server 60 is "http://service.bro.com/", "http://service.bro.com/copyfile?id=fileA" is created as the data acquiring URL. "id=fileA" in the URL is data for specifying the identification code. Moreover, "copyfile?" is a command for acquiring data from a server.

In such manner, as the data acquiring URL is generated, the generated URL is subjected to two-dimensional encoding. Moreover, the two-dimensional encoded URL is combined with the document data. As the document data is converted to data for print and transmitted to the printer 48, the printer 48 prints the two-dimensional code 104 on the document 100 as shown in FIG. 3. The two-dimensional code 104 printed on the document 100 is the data acquiring URL subjected to two-dimensional encoding. Therefore, as a person to whom the document 100 is distributed picks up an image of the two-dimensional code 104 by the camera of the mobile telephone 55, the mobile telephone 55 acquires the data acquiring URL. Accordingly, the mobile telephone 55 is capable of making an access to the storage server 60 by using the data acquiring URL that has been acquired.

Figure 4:
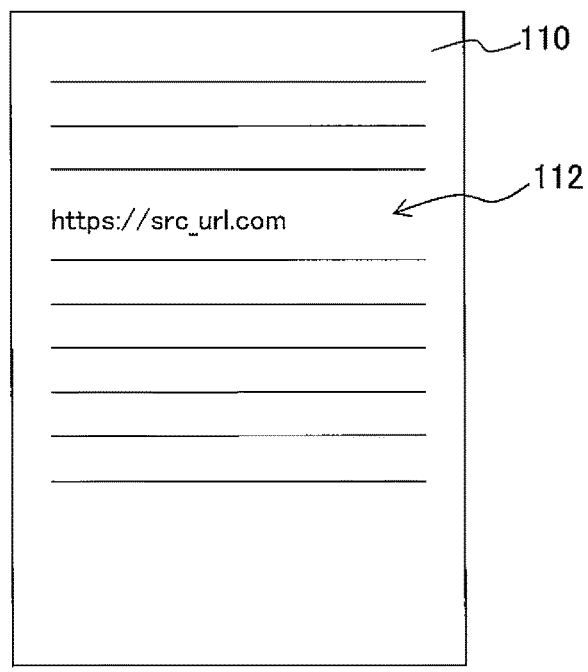
FIG. 4 is a diagram showing a document on which a text based on a document data, in which a hyperlink has been embedded, is printed.

Moreover, in a case that a hyperlink has been set in the URL, after document data in which the hyperlink is embedded has been converted to data for print and transmitted to the printer 48, a document 110 shown in FIG. 4 is printed in the printer 48. That URL 112 is printed on the document 110, but in a case that the linked device is not open to the public network, a scheme of the URL 112 printed on the document 110 is "https". For this reason, it is not possible to make an access to the linked device even by using that URL 112.

Figure 5:
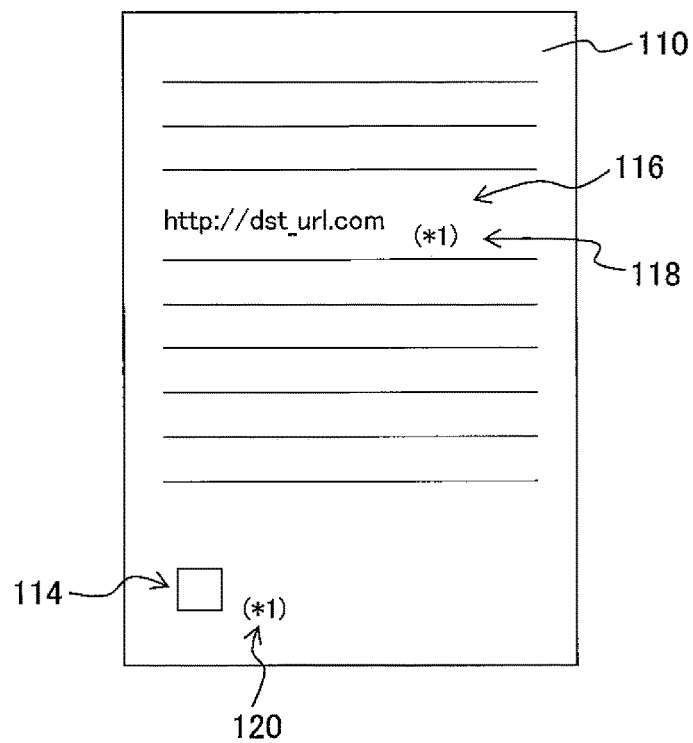
FIG. 5 is a diagram showing a document on which a text based on a document data, with which two-dimensional encoded URL has been combined, is printed.

Therefore, even in a case that the hyperlink has been set in the URL and the linked device has not been made open to the public on the public network, as aforementioned, a transmission of the contents to a device that is open to the public network, generation of the data acquiring URL, two-dimensional encoding of the data acquiring URL, and combining of the data acquiring URL that has been two-dimensional encoded with the document data are carried out. Moreover, as the document data that has been combined is printed, the two-dimensional code 114 is printed on the document 110 as shown in FIG. 5. The two-dimensional code 114 printed on the document 110 is a code obtained by two-dimensional encoding of the data acquiring URL. Therefore, as a person to whom the document 110 is distributed picks up an image of the two-dimensional code 114 by the camera of the mobile telephone 55 for example, the data acquiring URL is acquired by the mobile telephone 55. Accordingly, the mobile telephone 55 is capable of making an access to the storage server 60 by using the data acquiring URL that has been acquired.

Furthermore, a data acquiring URL 116 is printed instead of the URL 112 on the document 110. In other words, when the data acquiring URL that has been two-dimensional encoded is combined with the document data, data of a portion in which the hyperlink has been set is rewritten to data of the data acquiring URL. Therefore, a person to whom the document 110 is distributed is able to make an access to a device in which the contents have been stored, by inputting the URL printed on the document 110 to the mobile telephone 55. Even in this document 110, a specific symbol 118 is recorded next to the data acquiring URL 116, and a symbol 120 same as the symbol 118 is recorded next to the two-dimensional code 114.

<Acquiring Contents by Using Changed Hyperlink>

When an access source device makes an access to a device in which the contents have been stored by using the data acquiring URL, a processing for transmitting the contents to the access source device is carried out in the device in which the contents have been stored. For example, when the access source device makes an access to the storage server 60 by using the data acquiring URL, the first device 62 of the storage server 60 extracts an identification-code specifying data from the data acquiring URL that has been used for the access. Moreover, the first device 62 transmits, to the second device 66, a transmission request for transmitting the contents corresponding to the identification code that has been specified by that identification-code specifying data to the first device 62.

As the second device 66 receives the transmission request, the second device 66 makes a judgment of whether contents associated with the identification code that has been specified have been stored in the data storage area 92. This is because the contents are deleted in a case that a predetermined time has elapsed after the contents have been stored in the second device 66. More elaborately, as aforementioned, the uploading time which is a time at which the contents have been stored in the data storage area 92 of the second device 66 is stored in the second device 66, and when a predetermined time has elapsed after the uploading time, the contents stored in the data storage area 92 are deleted. Therefore, sometimes there are cases in which the contents associated with the specified identification code have not been stored in the data storage area 92.

In a case that the second device 66 has made a judgment that the contents associated with the specified identification code have been stored in the data storage area 92, the second device 66 transmits those contents to the first device 62. Whereas, in a case that the second device 66 has made a judgment that the contents associated with the specified identification code have not been stored in the data storage area 92, the second device 66 transmits error information to the first device 62.

As the first device 62 receives the contents, the first device 62 transmits the received contents to the access source device, in other words, to the mobile telephone 55 via the communication I/F 76. Accordingly, the mobile telephone 55 is capable of acquiring the contents associated with the specified identification code, in other words, the data that has been stored in the linked device. As the first device 62 receives the error information, the first device 62 transmits message indicating that the contents associated with the specified identification code do not exist, to the mobile telephone 55. In such manner, in the communication system 1, even if the linked device is a device that is not open to the public network, it is possible to acquire appropriately the contents stored in that linked device.

Moreover, in a case that the linked device is closed to the public network, highly confidential data has been stored in the linked device in many cases. Therefore, in the storage server 60 which stores contents considered to be highly confidential instead of the linked device, the contents are stored in the second device 66 which is not open to the public network. Accordingly, it becomes possible to secure appropriately the confidentiality of the contents. Particularly, in the storage server 60, in a case that the first device 62 has received the contents from the PC 10, the received contents are stored in the first device 62, and the contents are deleted from the first device 62 after the contents have been transmitted to the second device 66. Accordingly, the confidentiality of the contents is secured more appropriately. Furthermore, in the storage server 60, the contents are deleted after a predetermined time has elapsed since the contents were stored in the second device 66. Accordingly, the contents are prevented from being stored for a long time in a device in which the contents should not be stored, and the confidentiality of the contents is secured more appropriately.

<Control Program>

A change and a two-dimensional encoding of the above-mentioned hyperlink information are carried out by the CPU 12 of the PC 10 executing the control program 32. A flowchart when the CPU 12 executes the control program 32 will be described below by using FIGS. 6A and 6B.

As the control program 32 is executed, first of all, a hyperlink in document data is retrieved by the CPU 12 (step (hereinafter, abbreviated as "S") 100). Next, a judgment of whether a hyperlink has been embedded in the document data is made by the CPU 12 (step S102) based on a result of retrieving. In a case that a hyperlink has been embedded in the document data (YES at step S102), a judgment of whether a URL in which that hyperlink has been set is a public URL, namely, a scheme of the URL in which that hyperlink has been set is either "http" or "ftp", is made by the CPU 12 (step S104).

In a case that the URL in which the hyperlink has been set was not a public URL (NO at step S104), the CPU 12 makes an access to a linked device by using the URL in which the hyperlink has been set (step S106). Moreover, the CPU 12 acquires contents from the linked device (step S108). Next, the CPU 12 transmits the acquired contents to the storage server 60 (step S110), and acquires identification-code specifying data from the storage server 60 as a response thereof (step S112).

As the CPU 12 acquires the identification-code specifying data, the CPU 12 combines the identification-code specifying data and the URL of the storage server 60, and generates a data acquiring URL (step S114). Moreover, the CPU 12 changes the URL in which the hyperlink has been set to the data acquiring URL (step S116). Next, the CPU 12 carries out two-dimensional encoding of the data acquiring URL (step S118), and combines the two-dimensional encoded data acquiring URL with the document data (step S119). As the CPU 12 combines the two-dimensional encoded data acquiring URL with the document data, the CPU 12 converts the combined document data to data for print (step S120). Thereafter, the CPU 12 transmits the data for print to the printer 48 (step S122). With this, the control program 32 is terminated.

In a case that the URL in which the hyperlink has been set is a public URL at step S104 (YES at step S104), processing at steps from step S118 onward is carried out. Moreover, in a case in which no hyperlink has been embedded in the document data at step S102 (NO at step S102), the CPU 12 carries out processing at steps from step S120 onward.

Moreover, the contents stored in the storage server 60 are acquired by executing the control program 80 by the CPU 70 of the first device 62 of the storage server 60 and executing the control program 90 by the CPU 84 of the second device 66. A flow when the CPU 70 executes the control program 80 and a flow when the CPU 84 executes the control program 90 will be described below by using FIG. 7 and FIG. 8.

As the control program 80 is executed, first of all, a judgment of whether contents have been uploaded from the PC 10 is made by the CPU 70 (step S200). In a case that the contents have been uploaded (YES at step S200), the CPU 70 transmits the uploaded contents to the second device 66 (step S202). As the CPU 70 transmits the contents to the second device 66, the CPU 70 deletes the contents (step S203). Next, the CPU 70 acquires identification-code specifying data from the second device 66 as a response to the transmission of the contents (step S204). Thereafter, the CPU 70 transmits the acquired identification-code specifying data to a device which is a source of uploading, in other words, to the PC 10 (step S206), and the process returns to step S200.

Moreover, in a case that the contents have not been uploaded at step S200 (NO at step S200), a judgment of whether a request for transmission of the contents has been received is made by the CPU 70 (step S208). In other words, a judgment of whether an access has been made to the first device 62 by using the data acquiring URL from an external device such as the mobile telephone 55 is made by the CPU 70. In a case that the request for transmission of the contents has been received (YES at step S208), the CPU 70 extracts an identification code from the data acquiring URL that was used for the access, and transmits a request for transmission of contents specified by that identification code, to the second device 66 (step S210).

Next, the CPU 70 makes a judgment of whether contents have been received from the second device 66 as a response to the request for transmission of contents (step S212). In a case that the contents have been received from the second device 66 (YES at step S212), the CPU 70 transmits the received contents to a device from which the request was made, such as the mobile telephone 55 (step S214). Thereafter, the process returns to step S200. On the other hand, in a case that the contents have not been received from the second device 66 (NO at step S212), the CPU 70 transmits a message indicating that the contents do not exist to the device from which the request was made (step S216). Thereafter, the process returns to step S200. Even in a case that the request for transmission of contents has not been received at step S208 (NO at step S208), the process returns to step S200.

Moreover, as the control program 90 is executed, first of all, a judgment of whether contents have been received from the first device 62 is made (step S300). In a case that the contents have been received from the first device 62 (YES at step S300), the CPU 84 generates an identification code, and stores upon associating the identification code with the contents (step S302). Next, the CPU 84 transmits identification-code specifying data for specifying that identification code to the first device 62 (step S303). Thereafter, the CPU 84 stores a time and date at which the identification code and the contents were stored, as a time and date of uploading (step S304), and the process returns to step S300.

Moreover, in a case that the contents have not been received from the first device 62 at step S300 (NO at step S300), a judgment of whether a request for transmission of contents for which the identification code was specified has been received from the first device 62 is made by the CPU 84 (step S306). In a case that the request for transmission of contents for which the identification code was specified has been received (YES at step S306), a judgment of whether the contents specified by the identification code have been stored in the data storage area 92 is made by the CPU 84 (step S308).

In a case that the contents specified by the identification code have been stored (YES at step S308), the CPU 84 transmits the contents to the first device 62 (step S310), and the process returns to step S300. Whereas, in a case that the contents specified by the identification code have not been stored (NO at step S308), the CPU 84 transmits error information to the first device 62 (step S312), and the process returns to step S300.

Moreover, in a case that the request for transmission of contents for which the identification code is specified has not been received at step S306 (NO at step S306), a judgment of whether the contents, for which a predetermined time has elapsed since the time and date of uploading, have been stored is made by the CPU 84 (step S314), after referring to the stored time and date of uploading. In a case that the contents for which the predetermined time has elapsed since the time and date of uploading have been stored (YES at step S314), the contents are deleted (step S316), and the process returns to step S300. Whereas, in a case that the contents for which the predetermined time has elapsed since the time and date of uploading have not been stored (NO at step S314), processing at step S316 is skipped, and the process returns to step S300.

<Functional Configuration of CPU>

The CPU 12 which executes the control program 32 of the abovementioned PC 10, in view of executing processing, can be considered as having a functional configuration as shown in FIG. 1A. More specifically, the CPU 12 includes a hyperlink-information acquiring section 130, a contents acquiring section 132, a contents transmitting section 134, a URL-information acquiring section 136, a document-data generating section 138, and a judging section 140.

The hyperlink-information acquiring section 130 is a functional section which executes the processing at steps S100 and S102 of the control program 32. The contents acquiring section 132 is a functional section which executes the processing at step S108 of the control program 32. The contents transmitting section 134 is a functional section which executes the processing at step S110 of the control program 32. The URL-information acquiring section 136 is a functional section which executes the processing at step S112 of the control program 32. The document-data generating section 138 is a functional section which executes the processing at step S119 of the control program 32. The judging section 140 is a functional section which executes the processing at step S104 of the control program 32.

The CPU 70 which executes the control program 80 of the abovementioned first device 62, in view of executing processing, can be considered as having a functional configuration as shown in FIG. 1B. More specifically, the CPU 70 includes a first transmitting section 150, a third transmitting section 152, a fourth transmitting section 154, and a sixth transmitting section 156.

The first transmitting section 150 is a functional section which executes the processing at steps S202 and S203 of the control program 80. The third transmitting section 152 is a functional section which executes the processing at step S206 of the computer program 80. The fourth transmitting section 154 is a functional section which executes the processing at step S210 of the control program 80. The sixth transmitting section 156 is a functional section which executes the processing at step S214 of the control program 80.

Moreover, the CPU 84 which executes the control program 90 of the abovementioned second device 66, in view of executing processing, can be considered as having a functional configuration as shown in FIG. 1B. More specifically, the CPU 84 includes a storage control section 160, a second transmitting section 162, and a fifth transmitting section 164.

The storage control section 160 is a functional section which executes the processing at step S302 of the control program 90. The second transmitting section 162 is a functional section which executes the processing at step S303 of the control program 90. The fifth transmitting section 164 is a functional section which executes processing at step S310 of the control program 90.

Second Embodiment

In a communication system 1 according to a second embodiment of the present teaching, by the data acquiring URL generated in the first device 62 being transmitted to the PC 10, change of the hyperlink information is carried out in the PC 10. Generating the data acquiring URL in the first device 62 and changing the hyperlink information in the PC 10 will be described below in detail. Since a method of data processing except for generating the data acquiring URL in the first device 62 and changing the hyperlink information in the PC 10 is the same as the method in the first embodiment, description thereof is omitted. Moreover, since a configuration of the communication system 1 in the second embodiment is the same as the configuration of the communication system 1 in the first embodiment, description thereof is omitted here.

As the first device 62 of the second embodiment receives the identification code from the second device 66, the first device 62 generates the data acquiring URL by combining data for specifying that identification code and data which indicates URL of the storage server 60. Moreover, the first device 62 transmits that data acquiring URL to the PC 10 via the communication I/F 76. On the other hand, as the PC 10 receives the data acquiring URL, the PC 10 carries out two-dimensional encoding of the data acquiring URL, and combines the two-dimensional encoded data acquiring URL and the document data. By the document data being printed, the two-dimensional code which enables to acquire contents is printed on a document. Accordingly, even in the communication system 1 of the second embodiment, it is possible to achieve an effect similar to the effect achieved by the communication system 1 of the first embodiment.

Figure 9A:
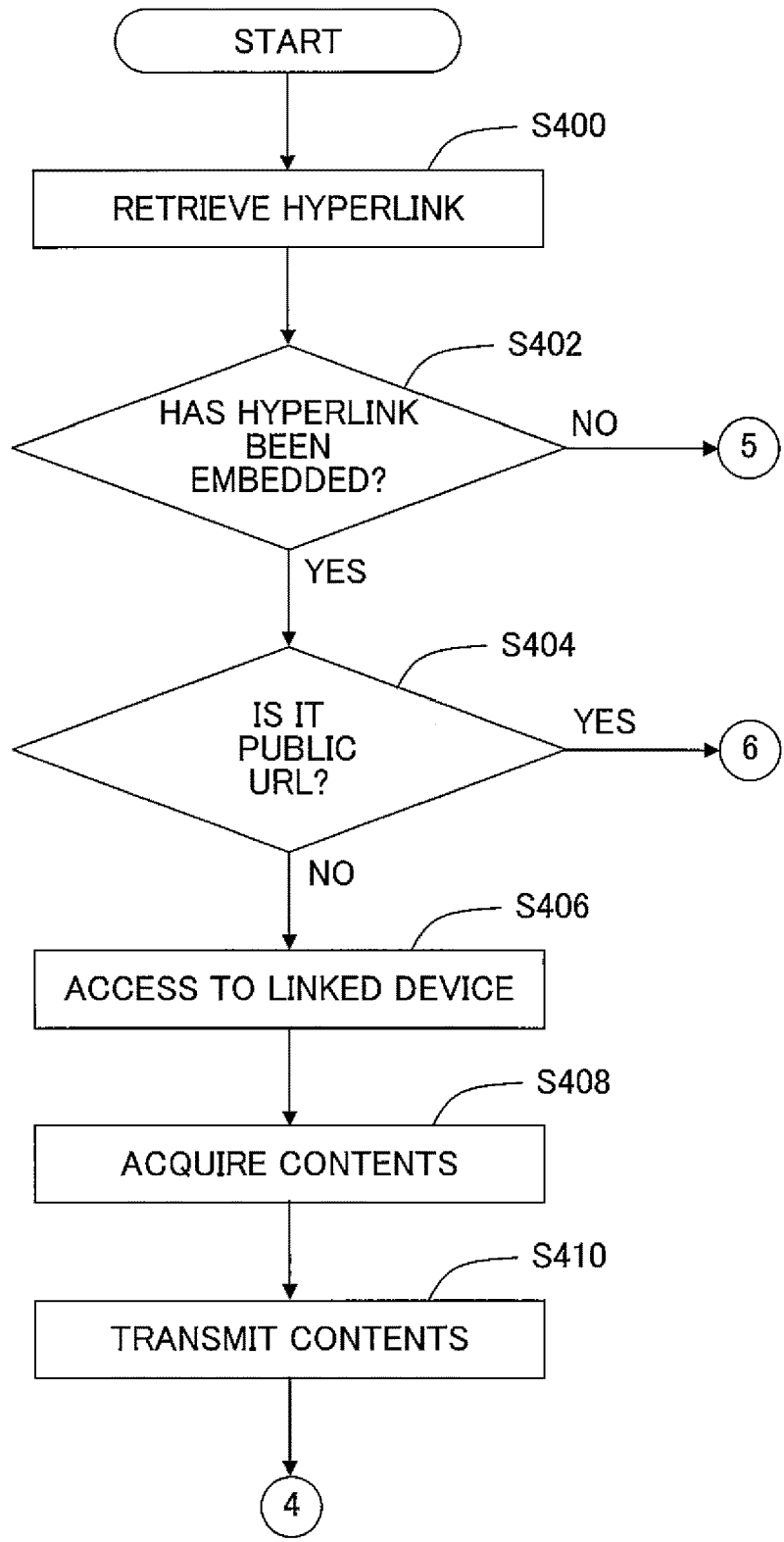
FIGS. 9A and 9B show a flowchart showing an operation of a PC according to a second example.
Figure 9B:
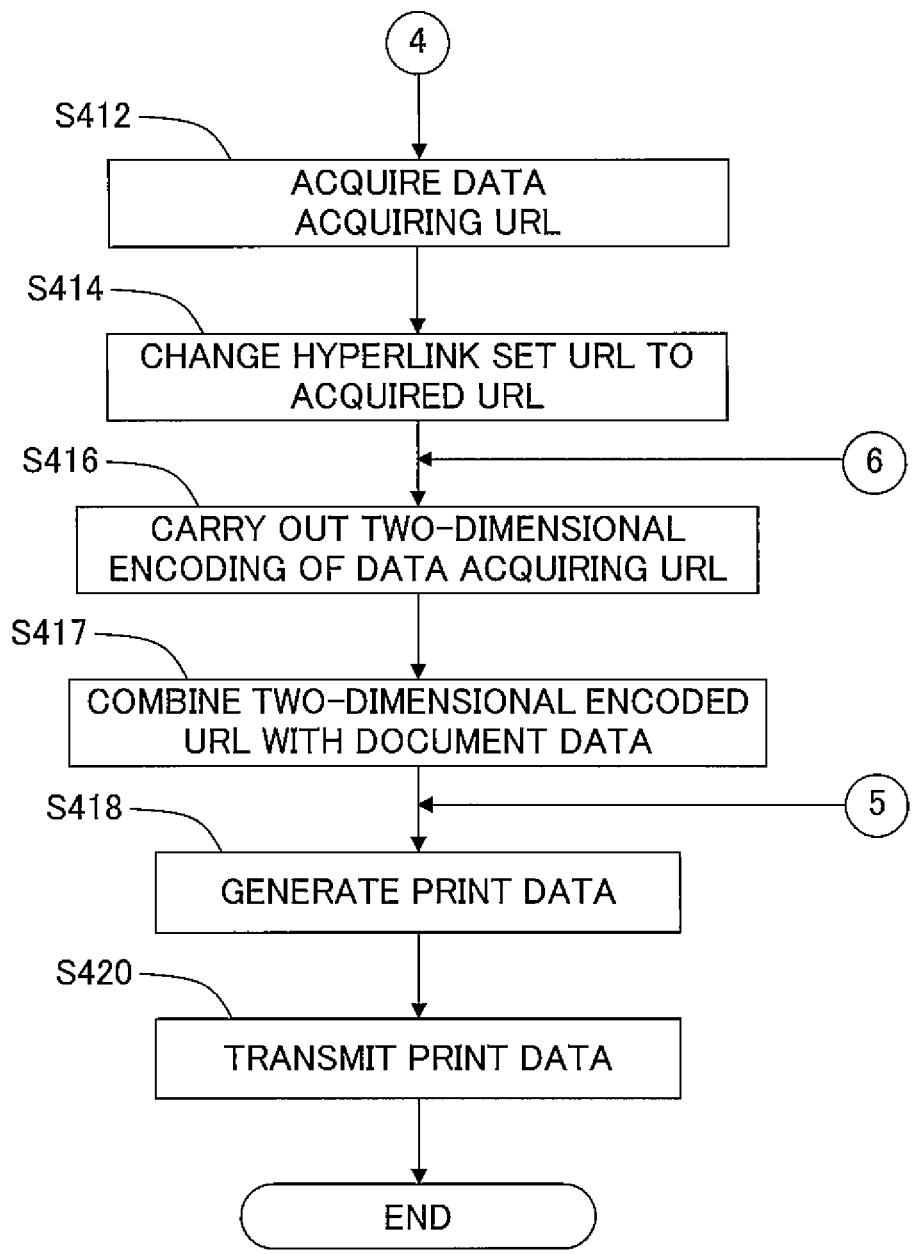
Figure 10:
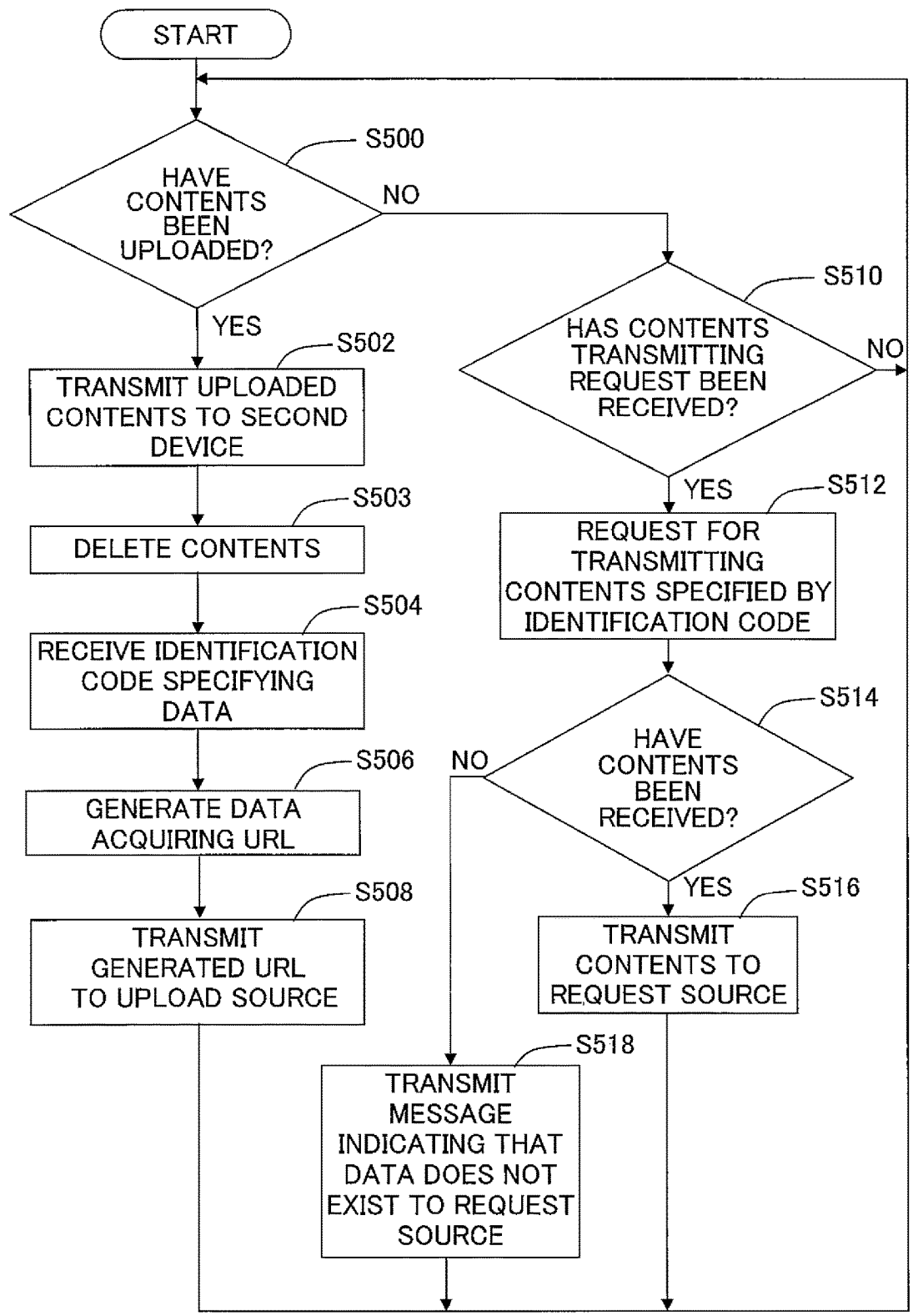
FIG. 10 is a flowchart showing an operation of a first device according to the second example.

Generating the data acquiring URL in the first device 62, and changing the hyperlink information in the PC 10 mentioned above are carried out by executing the control program 32 by the CPU 12 of the PC 10 and executing the control program 80 by the CPU 70 of the first device 62 of the storage server 60. A flow when the CPU 12 executes the control program 32 and a flow when the CPU 70 executes the control program 80 will be described below by using diagrams from FIG. 9A to FIG. 10. Since the flow at the time of executing the control program 32 and the control program 80 of the second embodiment includes processing same as the processing included in the flow at the time of executing the control program 32 and the control program 80 of the first embodiment, description of the same processing is omitted.

Figure 6A:
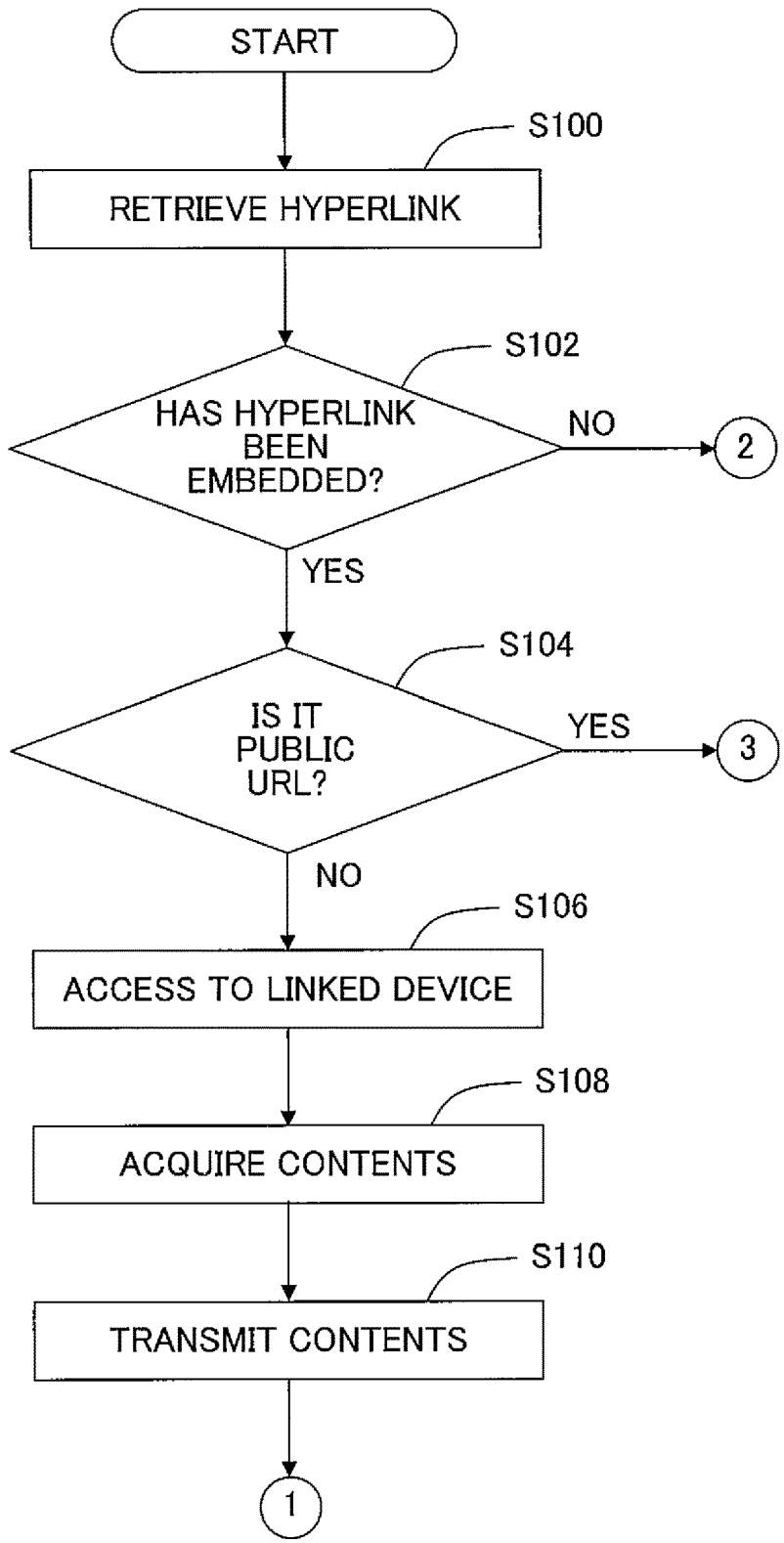
FIGS. 6A and 6B show a flowchart showing an operation of a PC.
Figure 6B:
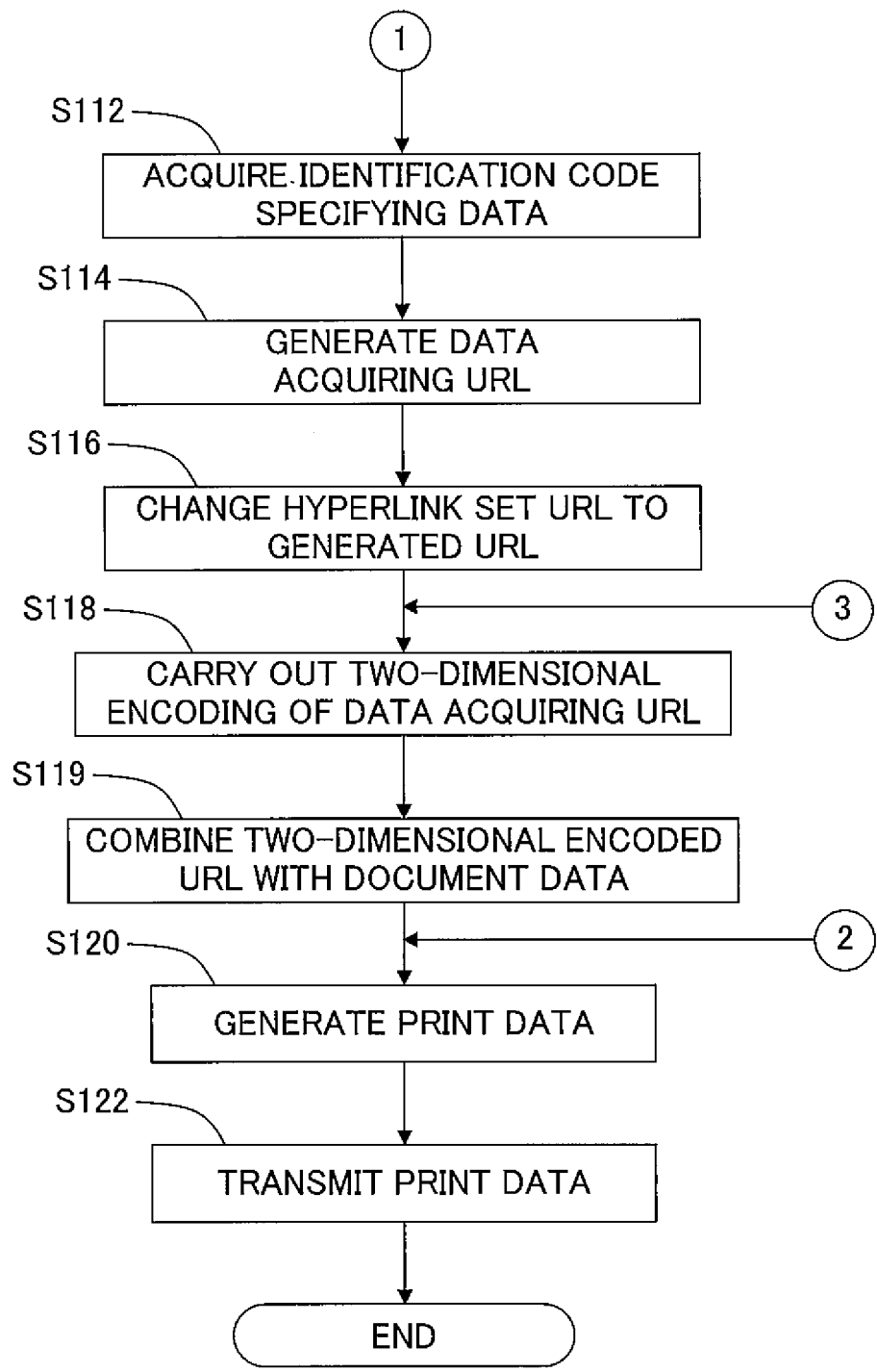

When CPU 12 of the PC 10 executes the control program 32, at steps from S400 to S410, the CPU 12 carries out processing same as the processing at steps from S100 to S110 shown in FIG. 6A. Moreover, the CPU 12 receives the data acquiring URL from the first device 62 via the wireless LAN I/F 20 (step S412). Next, the CPU 12 changes the URL in which the hyperlink has been set to the data acquiring URL (step S414). Thereafter, the CPU 12, at steps from S416 to S420, carries out processing same as the processing at steps from S118 to S122 shown in FIG. 6B. With this, the control program 32 is terminated.

Figure 7:
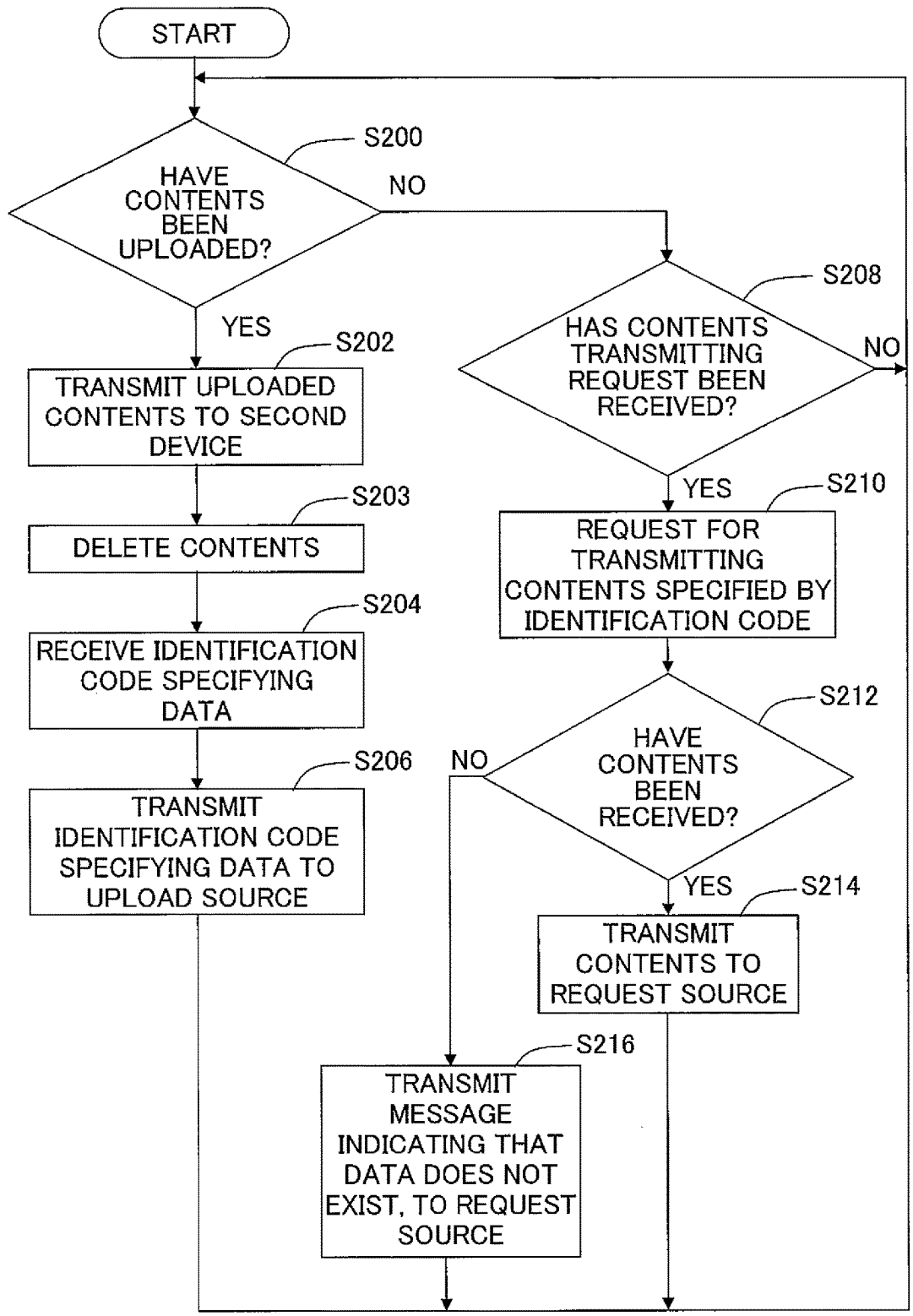
FIG. 7 is a flowchart showing an operation of a first device.
Figure 8:
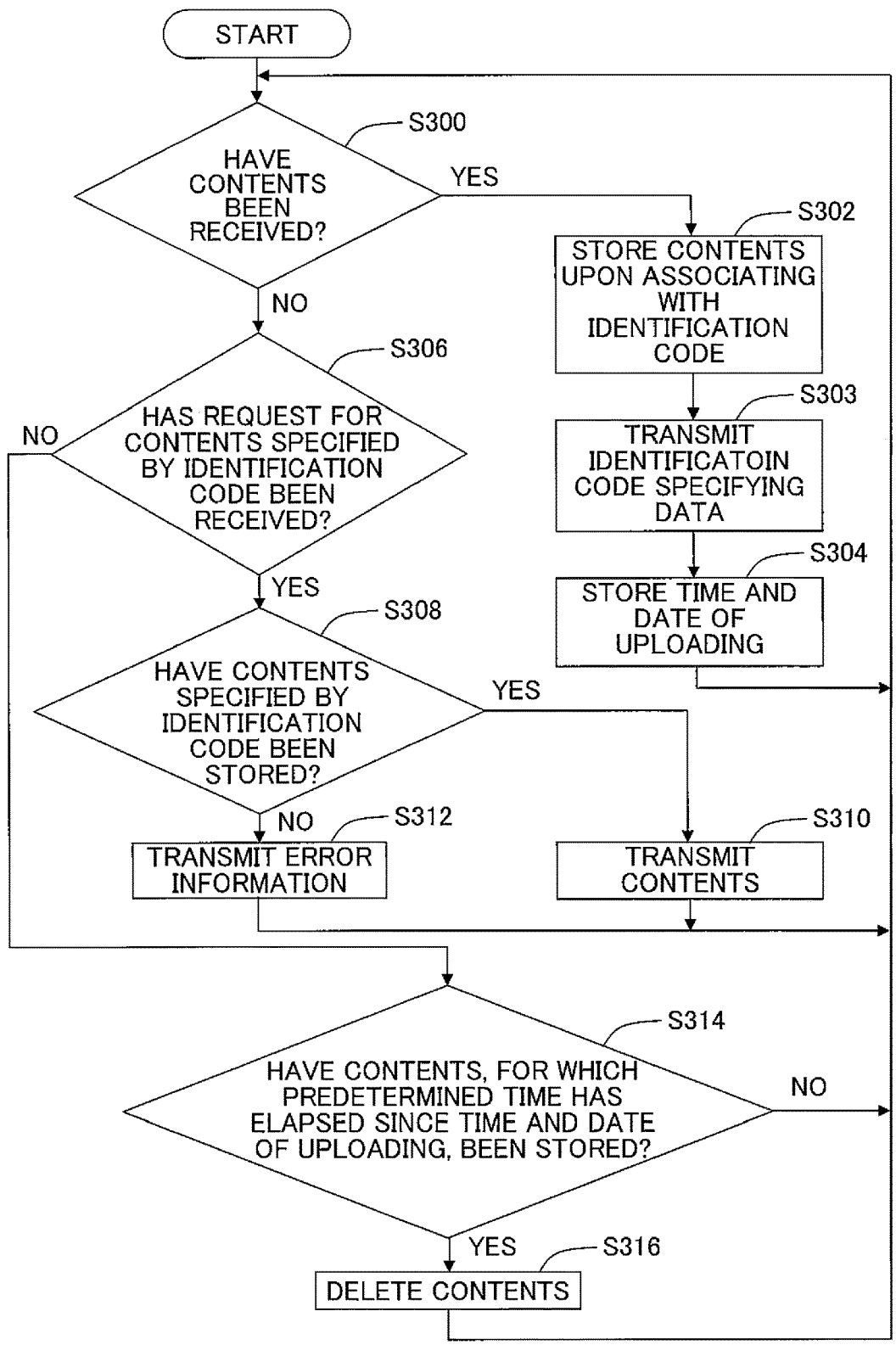
FIG. 8 is a flowchart showing an operation of a second device.

Moreover, when the CPU 70 of the first device 62 executes the control program 80, at steps from S500 to S504, the CPU 70 carries out processing same as the processing at steps from S200 to S204 shown in FIG. 7. Moreover, the CPU 70 generates the data acquiring URL by combining the data for specifying the identification code and the data indicating the URL of the storage server 60 (step S506). Next, the CPU 70 transmits the generated data acquiring URL to a device which is a source of uploading, in other words, to the PC 10 (step S508). Thereafter, the process returns to step S500. Moreover, at steps from S510 to S518, processing same as the processing at steps from S208 to S216 shown in FIG. 7 is carried out.

The present teaching is not restricted to the embodiments described heretofore, and it is possible to have various aspects in which various changes and modifications have been made based on a knowledge of a person skilled in the art. For instance, in the embodiments described heretofore, data such as the data acquiring URL has been converted to a two-dimensional code. However, the data may be converted to one-dimensional code such as a bar-code. In other words, the data such as the data acquiring URL is to be converted to a code symbol such as a one-dimensional code or a two-dimensional code.

Moreover, in the embodiments described heretofore, a hyperlinked device is different from the PC 10. However, a hyperlinked device may be a data storage area 34 in the PC 10. In such a case, a URL of a link destination is a URL which specifies the data storage area 34 in the PC 10, in other words, a local memory in the PC 10.

Moreover, in the embodiments described heretofore, the contents are to be stored in the storage server 60 which includes the second device 66 that is not open to the public network. However, the contents may be stored in a storage server which does not include an area that is not open to the public network.

Moreover, in the embodiments described heretofore, the document data with which the two-dimensional encoded data acquiring URL has been combined is converted to the data for print, and then printing on a document is performed based on the data for print. However, it is also possible to use document data that has been combined. Concretely, in a case that an image based on the combined document data is displayed on a panel of a PC other than the PC 10, it is possible to acquire contents from the storage server 60 by clicking by a mouse etc., a location at which the hyperlink has been set.

Moreover, in the embodiments described heretofore, examples, in which processing shown in diagrams from FIGS. 6A to 10 is executed by the CPU 12 etc., are described. However, without restricting to the CPU 12 etc., these processing may be executed by an ASIC (application specific integrated circuit) or other logic integrated circuit. Moreover, these processing may be executed by a combined operation of the CPU 12 etc., an ASIC, and other logic integrated circuit.

What is claimed is:

1. A non-transitory computer-readable storage medium storing computer-executable instructions that, when executed by a processor, cause an information processing apparatus comprising a communication section which is configured to communicate with a first storage server and a second storage server, to perform:
   a hyperlink-information acquiring process of acquiring, from document data, hyperlink information in which a hyperlink has been set, wherein the hyperlink information includes URL information of the first storage server;
   a contents acquiring process of acquiring contents specified by the hyperlink information from the first storage server, wherein the first storage server is not open to a public network;
   a contents transmission process of transmitting the contents to the second storage server that is open to the public network by communicating with the second storage server via the communication section, in a case that the contents are acquired in the contents acquiring process;
   a URL-information acquiring process of acquiring, from the second storage server via the communication section, URL-related information and generating a URL for acquiring the contents transmitted by the contents transmission process based on the acquired URL-related information; and
   a document-data generating process of generating combined document data in which the generated URL is combined with the document data, in a case that the URL and the URL-related information are acquired in the URL-information acquiring process.

2. The storage medium according to claim 1, wherein the instructions cause the information processing apparatus to further perform a judging process of judging whether a scheme of another URL related to the URL information of the first storage server is a predetermined scheme, and
   wherein the contents acquiring process is performed in a case that it is judged in the judging process that the scheme of the another URL is not the predetermined scheme.

3. The storage medium according to claim 2, wherein the predetermined scheme includes Hyper Text Transfer Protocol.

4. The storage medium according to claim 2, wherein the predetermined scheme includes File Transfer Protocol.

5. The storage medium according to claim 1,
   wherein the URL-information acquiring process is a process of acquiring information for specifying the contents that are transmitted to the second storage server via the communication section, and
   wherein the document-data generating process is a process of generating the combined document data in which the document data is combined with the URL, which is acquired based on information for specifying the second storage server and the URL-related information.

6. The storage medium according to claim 1,
   wherein the document-data generating process is a process of generating the combined document data in which the URL is combined with the document data, and
   wherein the URL is described in a format of a code symbol.

7. The storage medium according to claim 1, wherein the instructions include an instruction for generating data for print.

8. The storage medium according to claim 7,
   wherein the information processing apparatus is capable of communicating with a printer via the communication section, and
   wherein the instructions cause the information processing apparatus to further perform a document-data transmitting process of transmitting the combined document data generated by the document-data generating process to the printer via the communication section.

9. The storage medium according to claim 1, wherein the hyperlink-information acquiring process is a process of acquiring the URL information of the first storage server, which is designated by the hyperlink in the document data, as the hyperlink information.

10. The storage medium according to claim 1, wherein the instructions cause the information processing apparatus to further perform:
    determining whether or not the first storage server is open to the public network, responsive to the hyperlink-information acquiring process.

11. An information processing apparatus comprising:
    a communication section configured to communicate with a first storage server and a second storage server; and
    a control section,
        wherein the control section comprises:
        a hyperlink-information acquiring section configured to acquire, from document data, hyperlink information in which a hyperlink has been set, wherein the hyperlink information includes URL information of the first storage server;
a contents acquiring section configured to acquire contents specified by the hyperlink information from the first storage server, wherein the first storage is not open to a public network;
a contents transmitting section configured to transmit the contents to the second storage server that is open to the public network by communicating with the second storage server via the communication section, in a case that the contents acquiring section acquires the contents;
a URL-information acquiring section configured to acquire, from the second storage server via the communication section, URL-related information and generate a URL for acquiring the contents transmitted by the contents transmitting section based on the acquired URL-related information; and
a document-data generating section configured to generate combined document data in which the URL is combined with the document data, in a case that the URL-information acquiring section acquires the URL and the URL-related information.

12. The information processing apparatus according to claim 11, wherein the control section is configured to determine whether or not the first storage server is open to the public network, responsive to the acquiring hyperlink information by the hyperlink-information acquiring section.

13. A communication system comprising:
an information processing apparatus; and
a server machine,
wherein the information processing apparatus comprises:
an information processing apparatus communication section configured to communicate with external devices; and
an information processing apparatus control section,
wherein the information processing apparatus control section comprises:
a hyperlink-information acquiring section configured to acquire hyperlink information corresponding to a hyperlink from document data;
a contents acquiring section configured to acquire contents specified by the hyperlink information;
a contents transmitting section configured to transmit the contents to the server machine by communicating with the server machine via the information processing apparatus communication section, in a case that the contents acquiring section acquires the contents;
a URL-information acquiring section configured to acquire, from the server machine via the information processing apparatus communication section, URL-related information and generate a URL for acquiring the contents transmitted by the contents transmitting section based on the acquired URL-related information; and
a document-data generating section configured to generate combined document data in which the URL is combined with the document data, in a case that the URL-information acquiring section acquires the URL and the URL-related information, and
wherein the server machine comprises:
a first device which comprises a first device control section and a first device communication section configure to communicate with the external devices and which is open to a public network; and
a second device which comprises a storage section and a second device control section, which is configured to communicate with the first device, and which is closed with respect to the public network,
wherein the first device control section comprises a first transmitting section configured to transmit the contents to the second device and then to delete the contents, in a case that the contents are acquired from the information processing apparatus via the first device communication section,
wherein the second device control section comprises:
a storage control section configured to store the contents that are transmitted by the first transmitting section in the storage section, in a state that identification information for identifying the contents is associated with the contents; and
a second transmitting section configured to transmit the identification information to the first device, and
wherein the first device control section comprises a third transmitting section configured to transmit, to the information processing apparatus via the first device communication section, the URL and the URL-related information including at least the identification information that is transmitted by the second transmitting section.

14. The communication system according to claim 13, wherein the first device control section comprises a fourth transmitting section configured to transmit, to the second device, a transmission command of transmitting the contents identified by the identification information included in the URL to the first device, in a case that a communication using the URL is established with a predetermined device via the first device communication section,
wherein the second device control section comprises a fifth transmitting section configured to transmit the contents identified by the identification information to the first device as a response to the transmission command, and
wherein the first device control section comprises a sixth transmitting section configured to transmit the contents that are transmitted by the fifth transmitting section to the predetermined device via the first device communication section.

* * * * *